United States Patent [19]
Wenzel et al.

[11] 3,954,444
[45] May 4, 1976

[54] PROCESS FOR THE DIRECT REDUCTION OF IRON ORES

[75] Inventors: Werner Wenzel, Aachen; Peter Speich, Cologne; Friedrich H. Franke; Burkhardt Dreyer, both of Aachen, all of Germany

[73] Assignees: Rheinische Braunkohlenwerke AG, Cologne; Werner Wenzel, Aachen, both of Germany

[22] Filed: Feb. 15, 1974

[21] Appl. No.: 442,987

[30] Foreign Application Priority Data
Feb. 17, 1973 Germany............................ 2307924

[52] U.S. Cl............................................... 75/42; 75/35
[51] Int. Cl.² ............................................. C21B 5/06
[58] Field of Search................ 75/34, 35, 26, 40–42; 48/210

[56] References Cited
UNITED STATES PATENTS

| | | | |
|---|---|---|---|
| 2,674,524 | 4/1954 | Garbo | 48/210 X |
| 2,683,657 | 7/1954 | Garbo | 48/210 X |
| 2,824,793 | 2/1958 | DeJahn | 75/40 |
| 3,511,642 | 5/1970 | Etherington | 75/26 |

*Primary Examiner*—M. J. Andrews
*Attorney, Agent, or Firm*—Sughrue, Rothwell, Mion, Zinn & Macpeak

[57] ABSTRACT

A process for the direct reduction of iron ores using a reducing gas mixture which is passed through a shaft furnace containing the ore to be reduced is disclosed. The process is characterized in that the partial flow of reducing gas mixture is removed from the furnace approximately at the point of transition between the magnetite and Wustite stages of the ore and is regenerated. The regenerated reducing gas is then reapplied to the furnace with a fresh reducing gas mixture resulting in a substantial energy saving.

8 Claims, 4 Drawing Figures

DESIRED IDEAL REDUCTION PROFILE OF THE STATES OF EQUILIBRIUM OF OXYGEN DECOMPOSITION BY CARBON MONOXIDE AT 900°C

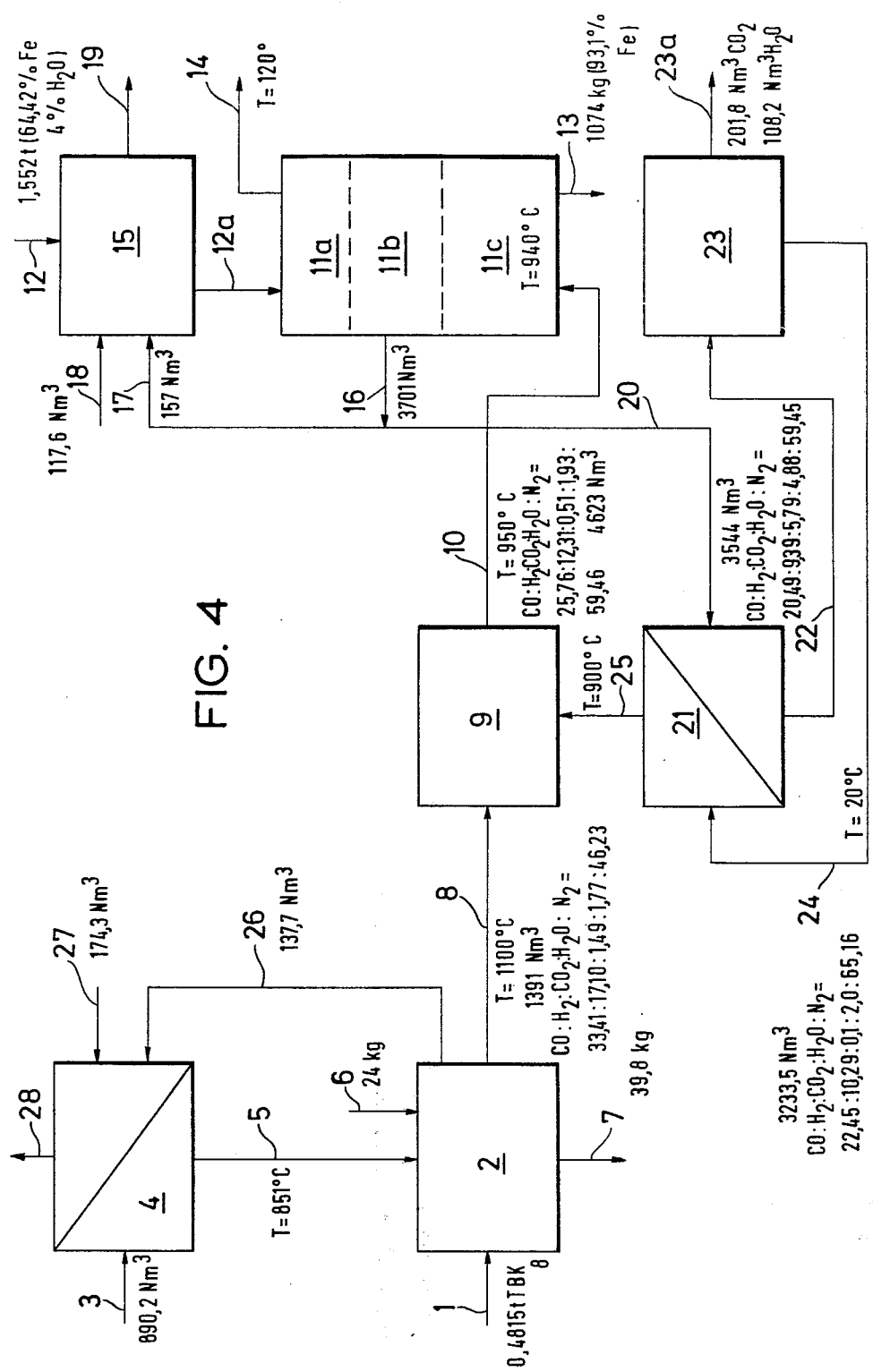

3,954,444

PROCESS FOR THE DIRECT REDUCTION OF IRON ORES

BACKGROUND OF THE INVENTION

The present invention relates to a process for the direct reduction of iron ores using a reducing gas mixture which is passed, preferably in countercurrent relationship, through a shaft furnace containing the ore to be reduced.

One object of the present invention is to substantially reduce the energy required for this process.

To solve this and other problems it is proposed, according to the invention, that before it reaches the rear end of the furnace in the direction of flow, a part of the reducing gas mixture is removed from the furnace, subjected to a regeneration treatment and subsequently reapplied to the furnace together with a fresh reducing mixture.

SUMMARY OF THE INVENTION

The basic concept of the invention will now be described in reference to a shaft furnace, without the use of the invention being limited to a shaft furnace.

The ore column located in the shaft furnace has practically unconverted starting material at its upper end whereas at its lower end there is substantially pure Fe. Transition stages are located between these two extremes, substantially the following layers or zones being arranged one on top of the other from top to bottom: hematite, magnetite, Wüstite, Fe.

The reducibility, that is, the readiness of the particular layer to give off oxygen decreases considerably from top to bottom. Reduction in the upper zones thus causes less difficulty than in the lower zones. Consequently, the gas flow remaining in the reduction stage or stages located towards the rear in the direction of flow are largely consumed and converted into a practically non-utilizable top gas. If the branched gas flow, after carbon dioxide and water vapor have been largely removed therefrom by a washing process known in itself, is mixed with the fresh reduction gas mixture, that is, the mixture coming from a gasifier, the fresh reduction gas to be added, for example, by gasification of coal, in respect to carbon monoxide and hydrogen only slightly exceeds the necessary quantity of reducing gas required for the stoichiometric decomposition of the oxygen in the ore.

A saving of up to 50% can be obtained by using the process according to the invention. This means that up to half of the quantity of "fresh" reducing gas can be saved which would otherwise have to be used if the entire reducing gas flow were converted to exit gas of the reduction aggregate. Costs are obviously unavoidable for the purification, etc., of the part of the gas flow to be returned. However, these costs are substantially lower than those which would be incurred by the production of a corresponding amount of reducing gas.

It has been found particularly advantageous to remove the partial flow of the reducing gas mixture from the reduction aggregate approximately at the point where the ore to be treated is converted in the course of the reduction process from the magnetite to the Wüstite stage. In this region, the reduction gas still has an adequate reduction potential for it to be usefully passed through the Wüstite stage after the constituents which no longer have a reducing effect have been removed. In any event, in the case of the known process it represents a waste to use the reducing gas leaving the Wüstite or magnetite stages to treat the hematite stage where the readiness of the ore to give off oxygen is considerable anyway.

According to the invention, the reducing gas mixture is produced by the gasification of coal, preferably lignite (brown coal), in direct current in a fluidizing bed operated directly above the first vortex. This is advantageously effected using a so-called high temperature Winkler generator which has been known for many years but is generally operated at low temperatures. In the process according to the invention, for obtaining a directly utilizable reducing gas using reactive combustible fuels such as lignite, the temperatures of up to 900° which are normally used have been raised to approximately 1,100° C. This temperature is sufficient to produce a reducing gas with a sufficiently low degree of oxidation (for example, between 3% and 10% preferably less than 5%). This degree of oxidation refers to the proportion of $CO_2+H_2O$ in the entire CO, $CO_2$, $H_2O$, $H_2$ components contained in the reduction gas. The coal used in the process having a grain size of approximately 0 to 6 millimeters is advantageously pre-dried to a water content of 4 to 15% by weight before it is used in the fluidizing bed-gasifier and the desired gasification temperature is thus obtained by corresponding preheating of the air (or of the air having supplementary oxygen therein), for example, preheating to approximately 900° C. when lignite or brown coal is being gasified. Conditions in the fluidizing bed are regulated by the gas velocities in the proximity of the lower vortex in such a way that even fine grain coal can be caused to react for a sufficiently long periods of time in the fluidizing bed without it being discharged unused above with the gas flow. The quantity of gasifying agents is advantageously regulated in such a way that the water vapor discharged from the coal and the volatile constituents released from the coal contribute to the fluidizing of the coal in the gasifier which is advantageously operated in co-current. It may also be advantageous to use coal which has already been carbonized, for example, to in excess of 300° C. To prevent any sticking in the gasifier and to desulfurize the gas mixture being produced, limestone can be added to the coal in quantities of up to approximately 20% depending on the amount of slag and the composition thereof and preferably approximately 5% by weight. Firstly, this causes the ash to form lumps and thus to be more readily discharged. Slag deposits on the walls are avoided. Secondly, this causes the desulfurization of the freshly produced reducing gas in the gasifier. To avoid harmful sintering effects, for example, in the associated countercurrent shaft furnace or in the fluidizing bed reduction aggregate the reducing gas leaving the gasifier may be cooled to the desired temperature in the reduction aggregate, that is of up to approximately 1,000° C. either by the pre-reducing top gas being discharged (indirect heat transmission) or by the admixture of regenerated top gas such that at the maximum temperature produced in the reduction aggregate, agglomeration of the iron sponge produced therein is largely avoided. To obtain a particularly suitable top gas to be returned to the aggregate after rinsing, for example, when the same is removed from the magnetite stage, it is sought to obtain cyclical changing of the reducing gas flowing in the cross-current shaft furnace at right angles to the lowering direction of the ore, the gas direction being changed at intervals of approximately 5 to 60 minutes and preferably approximately every 15 minutes.

To obtain more advantageous ore conditions in the shaft furnace, in the fluidizing bed reduction aggregate or the like, the ore is preheated, the heat required for this treatment being produced by the burning of a partial flow of top gas, for example, from the magnetite stage.

High valent exhaust gas, for example, from the magnetite stage can also be used to preheat the air of the fluidizing bed gasifier. However, for reasons of reliability it may be more advantageous to burn directly a partial flow of the fresh reducing gas produced in the fluidizing bed gasifier to preheat the air. In this event, independence from the reducing method of operation for example, in the shaft from producing a reducing gas (preheating of the gasifying air) is obtained.

In the case of interconnected operation, for example, with a steel works, it is advantageous to use the high valent exhaust gas, for example, from the magnetite stage, or the reducing gas itself to produce electric energy when it is wished to make a steel-work complex including electric furnaces and a rolling mill self-sufficient.

The process according to the invention has the advantage over these processes which operate without feeding back the gas, that the energy requirement, for example, in the form of the addition of fresh coal, is reduced. In this way, it is possible to adjust the size of the gasifier and, for example, of the reduction shaft with respect to each other so that the optimum sizes are always obtained. An especially important factor is that by reducing the fuel consumption per ton of iron sponge produced, the economy of operation of the entire process is considerably increased.

BRIEF DESCRIPTION OF THE DRAWINGS

Various embodiments of the invention are represented in the drawings, in which:

FIG. 3 and FIG. 4 each show diagrams of the process steps involved in the conversion of brown coal to reducing gas and the use of the latter in a reduction aggregate.

DESCRIPTION OF THE PREFERRED EMBODIMENTS

Figure 1:
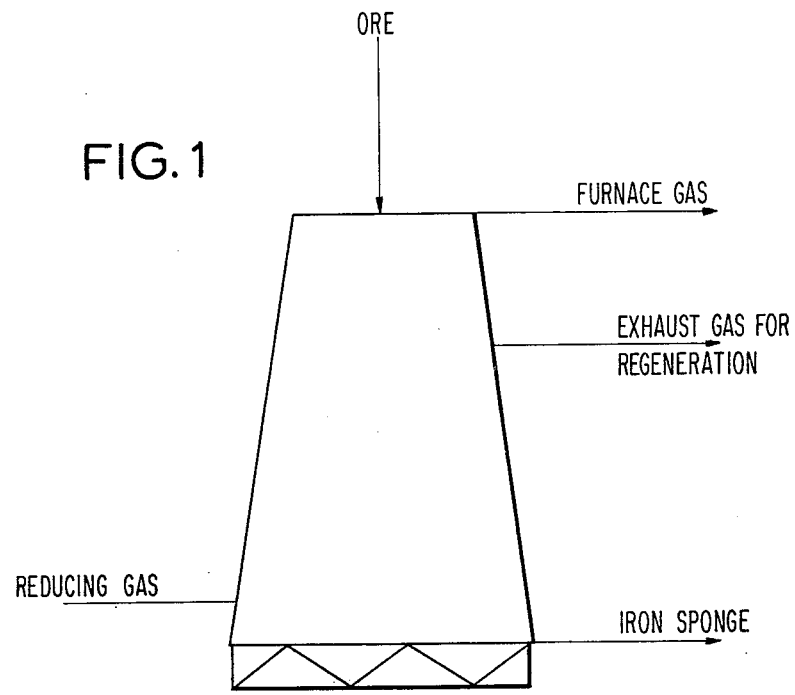
FIG. 1 is a diagram of the essential supply lines and discharge lines for the ore, the end product and the gas in a shaft furnace.
Figure 2:
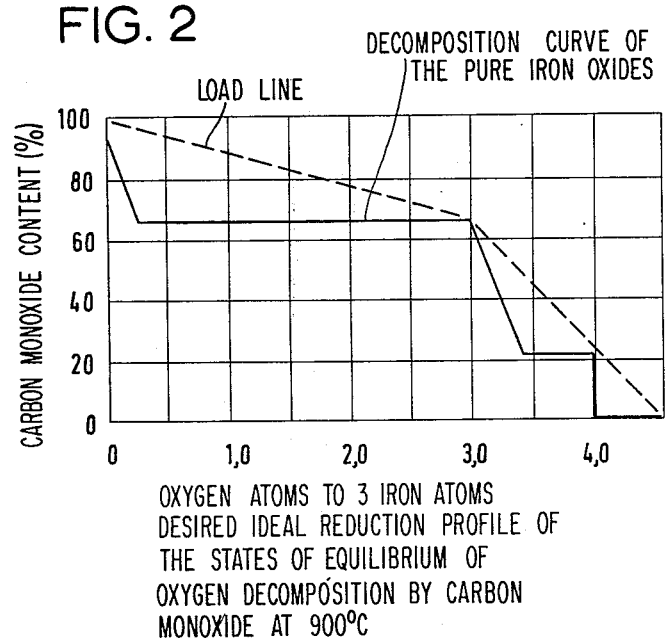
FIG. 2 is a graph of the decomposition of iron oxides.

It is apparent from FIG. 1 that part of the reducing gas which is introduced at the bottom of a shaft furnace is discharged as exhaust gas after leaving the Wüstite stage and is then used for regeneration purposes. It can be used to preheat the gasifying air of the fluidizing bed gasifier, to dry the ore and to regenerate the blast furnace gas, that is, to remove carbon dioxide and water vapor. The gas which is purified in this way in a generator is then recirculated.

It may be advantageous for the pre-reduction stage to be effected in a separate aggregate to that of the final reduction stage.

It is also advantageous to operate the fluidizing bed gasifier at an over-pressure rising to in excess of one bar, for example, in respect of a subsequently connected mixing chamber and the reduction aggregate, thereby avoiding gas pumps for the hot reducing gas and permitting perfect forced flow. It is also advantageous to effect the removal of hot dust from the particular gas flow (for example), from the fluidizing bed and the magnetite stage) according to known processes. When the fluidizing bed is operated at temperatures in excess of 1,100° C., it may be necessary to employ indirect fresh gas cooling, for example, using gas intended for preheating the gasifier air or for drying the ore.

Figure 3:
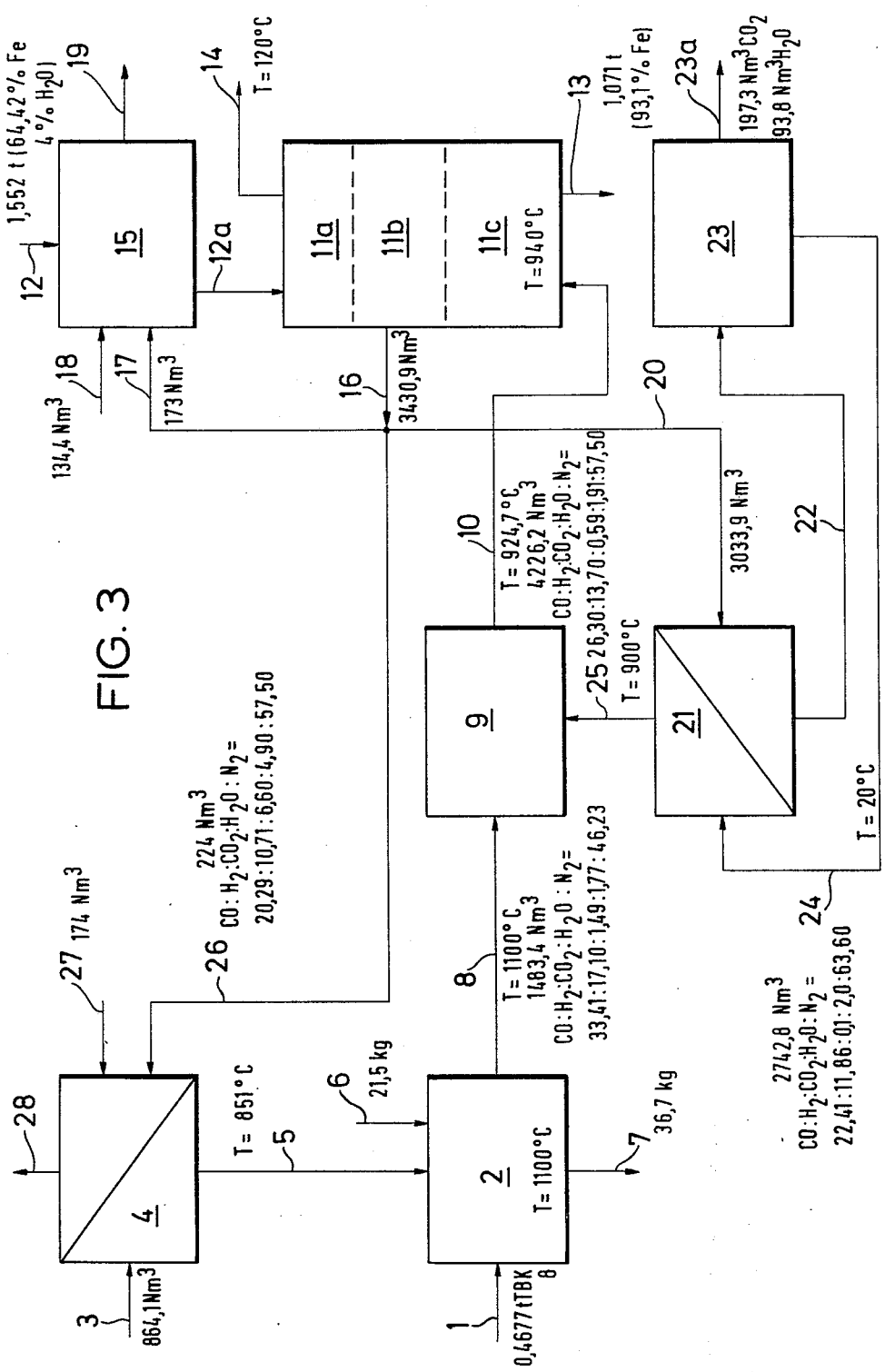

In the embodiment according to FIG. 3, the lignite 1 (0.4677 t, 8% water content) is supplied to the gasifier 2 operating at approximately 1,100° C. This gasifier is acted on by the gasifying air 3 (864.1 Nm$^3$) after being preheated in 4 by the flow of gasifying agents 5 (at 851° C.). Limestone 6 (21.5 kg) is also added in the gasifier. Ash 7 (36.7 kg) and the reducing gas 8 (1483.4 Nm$^3$ with a $CO:H_2:CO_2:H_2O:N_2$ ratio of 33.41:17.1:1.49:1.77:46.23 at 1,100° C.) are removed from the gasifier. The reducing gas 8 reaches the mixing chamber 9 to which the reheated, regenerated gas 25 having a temperature of approximately 900° C. is also supplied. The reducing gas 10 (4226.2 Nm$^3$ with a $CO:H_2:CO_2:H_2O:N_2$ ratio of 26.3:13.7:0.59:1.91:57.5 at 924° C.) leaves the mixing chamber 9 and moves to the lower part of the shaft furnace 11c which is operating in the final reduction stage at approximately 940° C. The ore 12 (1.552 t containing 64.42% Fe and 4% $H_2O$) moves to the ore dryer 15 and from there as dry ore 12a into the pre-reducing part 11a of the shaft. After leaving the Wüstite stage, the reducing gas 16 (3430.9 Nm$^3$) leaves the shaft part 11b and is split into the partial flow 17 (173 Nm$^3$), 20 (3033.9 Nm$^3$) and 26 (224 Nm$^3$ having the gas concentration: $CO:H_2:CO_2:H_2O:N_2$ = 20.29:10.71:6.6:4.9:57.5). The gas portion 17 reaches the ore dryer 15 together with the air 18 (134.4 Nm$^3$) from which the exhaust gas 19 is discharged. An unusable top gas 14 is discharged from the pre-reduction stage at approximately 120° C. The iron sponge 13 (1.0714 t containing 93.1% Fe) is yielded by the final reduction stage. The utilizable partial gas current 20 enters the counterflow heat exchanger 21 which it leaves as the gas current 22 for regeneration in regenerator 23 from which carbon dioxide and water vapor (approximately 197.3 Nm$^3$ $CO_2$ and 93.8 Nm$^3$ $H_2O$) are removed by the partial current 23a and the regenerated gas 24 flows into the countercurrent heat exchanger 21 which it leaves as the heated gas flow 25 (at approximately 900° C) with the gas ratio of $CO:H_2:CO_2:H_2O:N_2$ = 22.44:11.86:0.1:2.0:63.6). The partial flow 26 is burned with the air (174 Nm$^3$) in the air preheater 4 and leaves the preheater as the exhaust gas 28.

In contrast to FIG. 3, in FIG. 4 the air is preheated in the air preheater 4 in front of the fluidizing bed gasifier 2 by burning the product gas 26 (137.7 Nm$^3$). The easily variable mass and concentration ratios are shown in detail in FIG. 4.

The advantage of the invention is apparent when it is compared to processes which do not involve gas regeneration. If the process is effected totally without gas regeneration when a single stage reducing process is employed, a gas will be obtained from the prereducing stage which will contain a high quantity of both sensible and chemical energy which must be used in subsequent process steps not belonging to the pre-reducing stage in order to obtain sufficient economy of operation (for example, an associated production of electricity).

In this process, the amount of energy in the form of costly dry coal to be used increases by more than 100%. The excess energy supplied leads to waste heat problems (especially in the case of small plants where utilization of the waste heat would not appear to be warranted).

The important advantages of the process according to the invention are the following:

The low degree of oxidation in the reducing gas of the high temperature Winkler gasifier enables the gas leaving the gasifier after being mixed with the regenerated partial gas flow to be used directly for reduction purposes without any intermediate stages. With a carbon monoxide:hydrogen ratio of approximately 2:1, the requirement of an autothermal method of operation in the shaft is generally fulfilled during the reduction process. The high proportion of inert gas in the reducing gas (nitrogen) produces a uniform temperature profile in the reduction furnace.

The reducing gas produced is not only suitable for so-called direct reduction plants but it can also be insufflated as a substitute reduction agent in the blast furnace process. In this, a temperature of the gas of, for example, approximately 1,100° C. is suitable for insufflating the gas into the blast furnace zone having the same temperature and still containing a solid charge whereby the iron ore in the blast furnace is reduced nearly 100% in the solid state by the addition of gas in the furnace shaft. This helps to increase the output of the blast furnace and to substantially reduce the consumption of expensive coke. From this viewpoint, the role of the direct reduction aggregate for the iron ore is taken over by the upper part of the blast furnace with a solid charge.

With gas production in a fluidizing bed, depending on the application in point — whether this is for producing reducing gas for the associated direct reduction operation or for the blast furnace, it is advantageous to use a pressure level of approximately 10 bar in the case of direct reduction and preferably slightly above normal pressure; in the case of blast furnace it is advantageous to use a pressure which corresponds to the pressure in the blast furnace at the point of injection into the shaft, that is, preferably approximately 2.5 bar. This eliminates the need for special compression and pumping devices for the hot gas.

We claim:

1. A process for the direct reduction of iron ores using a reducing gas mixture which is passed through a furnace having a shaft containing ore in substantially the following stages arranged in the direction of gas flow from bottom to top: a first stage defined by a layer containing substantially Fe, a Wüstite stage defined by a layer containing substantially FeO, a magnetite stage defined by a layer containing substantially $Fe_3O_4$, and a hematite stage defined by a layer containing substantially $Fe_2O_3$, said process comprising the following steps:

generating a reducing gas having a $CO:H_2$ ratio between 1.5:1 to 2.5:1 at a temperature between 1050° and 1450°C;

mixing the generated reducing gas with a regenerated gas to produce a reducing gas mixture;

introducing the reducing gas mixture in said first stage of the furnace;

removing a partial flow of the reducing gas mixture from the furnace at the transition between said magnetite and Wüstite stages;

regenerating the gas mixture removed from the furnace by washing to remove $CO_2$ and $H_2O$ to produce a regenerated gas having a $CO:H_2$ ratio between 1.5:1 to 2.5:1; and heating the regenerated gas to a temperature to approximately 900°C before mixing with the generated reducing gas.

2. A process according to claim 1 wherein the step of generating a reducing gas is performed by the gasification of coal comprising the following steps:

introducing coal in co-flow in a fluidizing bed of a gasifier, said fluidizing bed having a temperature of approximately 1,100°C;

adding limestone in a quantity between 2% and 20% of the quantity of coal to the gasifier;

preheating gasifying air to between 450°C and 900°C; and injecting the preheated gasifying air into the gasifier, whereby the degree of oxidation of the reducing gas produced by the gasifier is between 3% and 10%.

3. A process according to claim 2 further comprising the step of pre-drying the coal before introduction into the gasifier to a water content of 4% to 15% by weight.

4. A process according to claim 2 wherein the step of preheating the gasifying air is performed by burning a portion of the partial flow removed from the furnace.

5. A process according to claim 2 wherein the step of preheating the gasifying air is performed by burning a portion of the reducing gas generated by the gasifier.

6. A process according to claim 2 further comprising the step of drying the iron ores before introduction of the ores into the furnace.

7. A process according to claim 2 wherein the step of introducing the recuding gas mixture in the furnace is performed in such a way that the gas mixture flows substantially transversely to the direction of ore movement periodically reversing direction such that the gas is guided in a more or less zig-zag fashion to the point where the partial flow of reducing gas mixture is removed from the furnace, said process further comprising the step of changing the direction of the transverse flow of the reducing gas mixture in the furnace at intervals between 5 and 60 minutes.

8. A process according to claim 2 wherein said furnace for the direct reduction of iron ores is the upper part of a blast furnace and the step of introducing the reducing gas mixture is performed by insufflating the reducing gas mixture via a tuyere level in which the temperature is within 100°C of the temperature at which the reducing gas is discharged from the gasifier.

* * * * *